(12) United States Patent
Heap et al.

(10) Patent No.: US 8,145,397 B2
(45) Date of Patent: Mar. 27, 2012

(54) OPTIMAL SELECTION OF BLENDED BRAKING CAPACITY FOR A HYBRID ELECTRIC VEHICLE

(75) Inventors: Anthony H. Heap, Ann Arbor, MI (US); Jason J McConnell, Ypsilanti, MI (US); Seamus T McGrath, Rohnert Park, CA (US)

(73) Assignees: GM Global Technology Operations LLC, Detroit, MI (US); Daimler AG, Stuttgart (DE); Chrysler LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 712 days.

(21) Appl. No.: 12/255,754

(22) Filed: Oct. 22, 2008

(65) Prior Publication Data
US 2009/0118957 A1 May 7, 2009

Related U.S. Application Data

(60) Provisional application No. 60/985,248, filed on Nov. 4, 2007.

(51) Int. Cl.
*G06F 7/00* (2006.01)
(52) U.S. Cl. ........... 701/51; 701/22; 701/54; 477/181
(58) Field of Classification Search .......... 701/22, 701/51, 54; 477/181
See application file for complete search history.

(56) References Cited

U.S. PATENT DOCUMENTS

| | | | |
|---|---|---|---|
| 5,951,614 A * | 9/1999 | Tabata et al. ............. | 701/54 |
| 6,832,148 B1 | 12/2004 | Bennett | |
| 6,862,511 B1 * | 3/2005 | Phillips et al. ........... | 701/54 |
| 6,868,318 B1 | 3/2005 | Cawthorne | |
| 7,154,236 B1 | 12/2006 | Heap | |
| 2005/0060079 A1 * | 3/2005 | Phillips et al. ........... | 701/53 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 * | 8/2005 | Hubbard et al. ......... | 701/1 |
| 2005/0182543 A1 | 8/2005 | Sah | |
| 2005/0182546 A1 | 8/2005 | Hsieh | |
| 2005/0182547 A1 | 8/2005 | Sah | |

(Continued)

*Primary Examiner* — Mary Cheung
*Assistant Examiner* — Truc M Do

(57) ABSTRACT

A hybrid powertrain system includes a transmission operative to transfer power between an input member and a torque machine and an output member coupled to a driveline coupled to a wheel including an actuable friction brake. The torque machine is operative to react torque transferred from the wheel through the driveline to the output member of the transmission. The torque machine is connected to an energy storage device. A method for operating a hybrid powertrain system includes monitoring an operator torque request input to an accelerator pedal, determining a minimum available power output of the energy storage device, determining a preferred output torque reacted through the output member to the driveline based upon the minimum available power output of the energy storage device, determining a regenerative braking torque capacity comprising a torque range between the preferred output torque reacted through the output member to the driveline and the operator torque request input to the accelerator pedal, and controlling operation of the hybrid powertrain based upon the regenerative braking torque capacity.

19 Claims, 7 Drawing Sheets

U.S. PATENT DOCUMENTS

| | | |
|---|---|---|
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1* | 11/2005 | Heap et al. ........................ 477/3 |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1* | 11/2005 | Hubbard et al. ................. 701/54 |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |

| | | |
|---|---|---|
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |

* cited by examiner

OPTIMAL SELECTION OF BLENDED BRAKING CAPACITY FOR A HYBRID ELECTRIC VEHICLE

CROSS REFERENCE TO RELATED APPLICATIONS

This application claims the benefit of U.S. Provisional Application No. 60/985,248 filed on Nov. 4, 2007 which is hereby incorporated herein by reference.

TECHNICAL FIELD

This disclosure pertains to control systems for hybrid powertrain systems.

BACKGROUND

The statements in this section merely provide background information related to the present disclosure and may not constitute prior art.

Known hybrid powertrain architectures include torque-generative devices, including internal combustion engines and electric machines, which transfer torque through a transmission device to an output member. One exemplary hybrid powertrain includes a two-mode, compound-split, electromechanical transmission which utilizes an input member for receiving tractive torque from a prime mover power source, preferably an internal combustion engine, and an output member. The output member can be operatively connected to a driveline for a motor vehicle for transferring tractive torque thereto. Electric machines, operative as motors or generators, generate a torque input to the transmission, independently of a torque input from the internal combustion engine. The electric machines may transform vehicle kinetic energy, transferred through the vehicle driveline, to electrical energy that is storable in an electrical energy storage device. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A hybrid powertrain system includes a transmission operative to transfer power between an input member and a torque machine and an output member coupled to a driveline coupled to a wheel including an actuable friction brake. The torque machine is operative to react torque transferred from the wheel through the driveline to the output member of the transmission. The torque machine is connected to an energy storage device. A method for operating a hybrid powertrain system includes monitoring an operator torque request input to an accelerator pedal, determining a minimum available power output of the energy storage device, determining a preferred output torque reacted through the output member to the driveline based upon the minimum available power output of the energy storage device, determining a regenerative braking torque capacity comprising a torque range between the preferred output torque reacted through the output member to the driveline and the operator torque request input to the accelerator pedal, and controlling operation of the hybrid powertrain based upon the regenerative braking torque capacity.

BRIEF DESCRIPTION OF THE DRAWINGS

One or more embodiments will now be described, by way of example, with reference to the accompanying drawings, in which.

DETAILED DESCRIPTION

Figure 1:
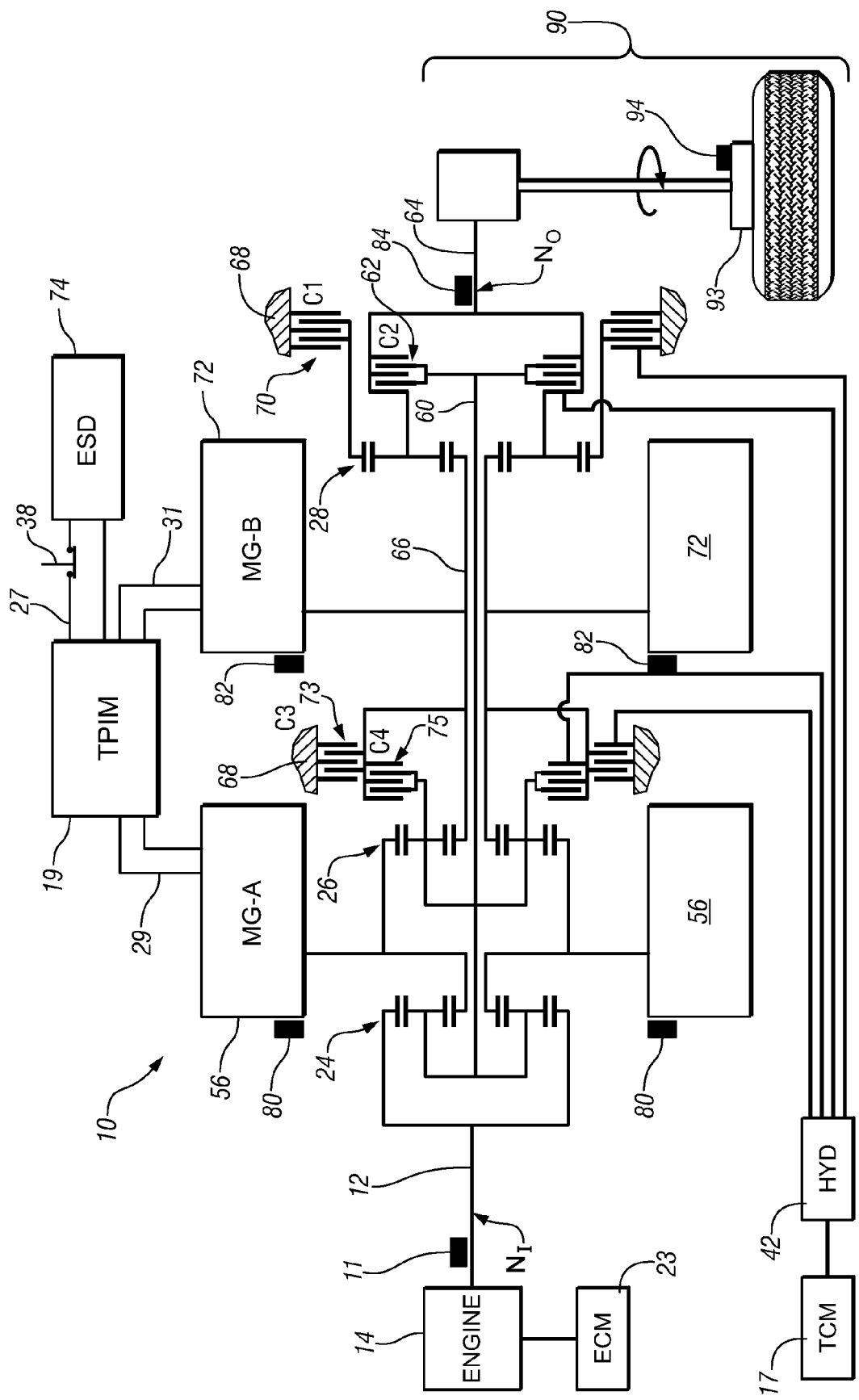
FIG. 1 is a schematic diagram of an exemplary hybrid powertrain, in accordance with the present disclosure.
Figure 2:
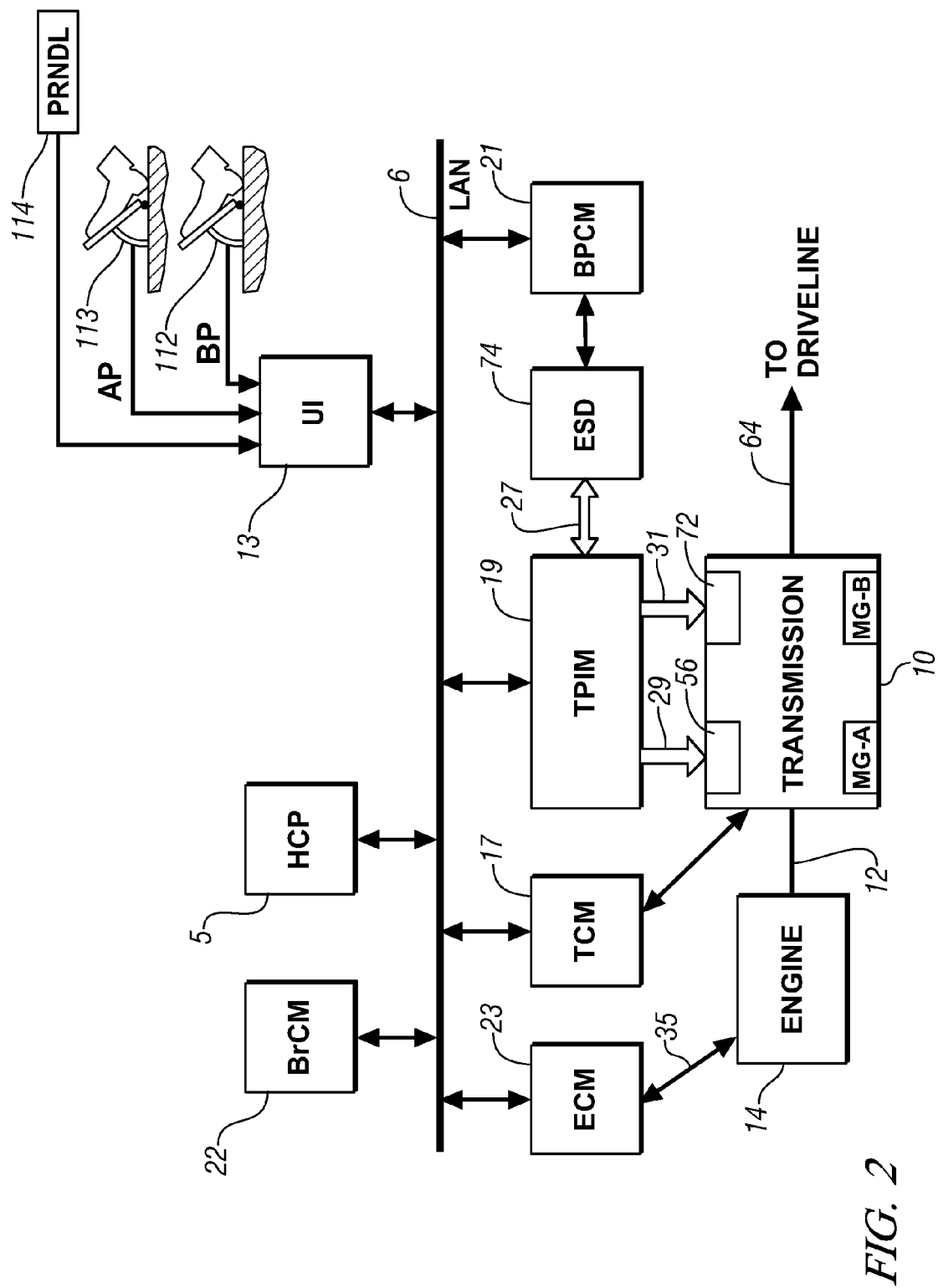
FIG. 2 is a schematic diagram of an exemplary architecture for a control system and hybrid powertrain, in accordance with the present disclosure.

Referring now to the drawings, wherein the showings are for the purpose of illustrating certain exemplary embodiments only and not for the purpose of limiting the same, FIGS. 1 and 2 depict an exemplary hybrid powertrain. The exemplary hybrid powertrain in accordance with the present disclosure is depicted in FIG. 1, comprising a two-mode, compound-split, electromechanical hybrid transmission 10 operatively connected to an engine 4 and torque machines comprising first and second electric machines ('MG-A') 56 and ('MG-B') 72. The engine 14 and first and second electric machines 56 and 72 each generate mechanical power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed $N_I$ and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, NO, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several states that can be described in terms of engine states comprising one of an engine-on state ('ON') and an engine-off state ('OFF'), and transmission operating range states comprising a plurality of fixed gears and continuously variable operating modes, described with reference to Table 1, below.

TABLE 1

| Description | Engine State | Transmission Operating Range State | Applied Clutches | |
|---|---|---|---|---|
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of inputto-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and the first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The engine state and the transmission operating range state are determined based upon a variety of operating characteristics of the hybrid powertrain. This includes the operator torque request communicated through the accelerator pedal 113 and brake pedal 112 to the user interface 13 as previously described. The transmission operating range state and the engine state may be predicated on a hybrid powertrain torque demand caused by a command to operate the first and second electric machines 56 and 72 in an electrical energy generating mode or in a torque generating mode. The transmission operating range state and the engine state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 at output member 64 that is required to meet the operator torque request while meeting other powertrain operating demands, e.g., charging the ESD 74. As should be apparent from the description above, the ESD 74 and the first and second electric machines 56 and 72 are electrically-operatively coupled for power flow therebetween. Furthermore, the engine 14, the first and second electric machines 56 and 72, and the electromechanical transmission 10 are mechanically-operatively coupled to transfer power therebetween to generate a power flow to the output member 64.

Figure 3:
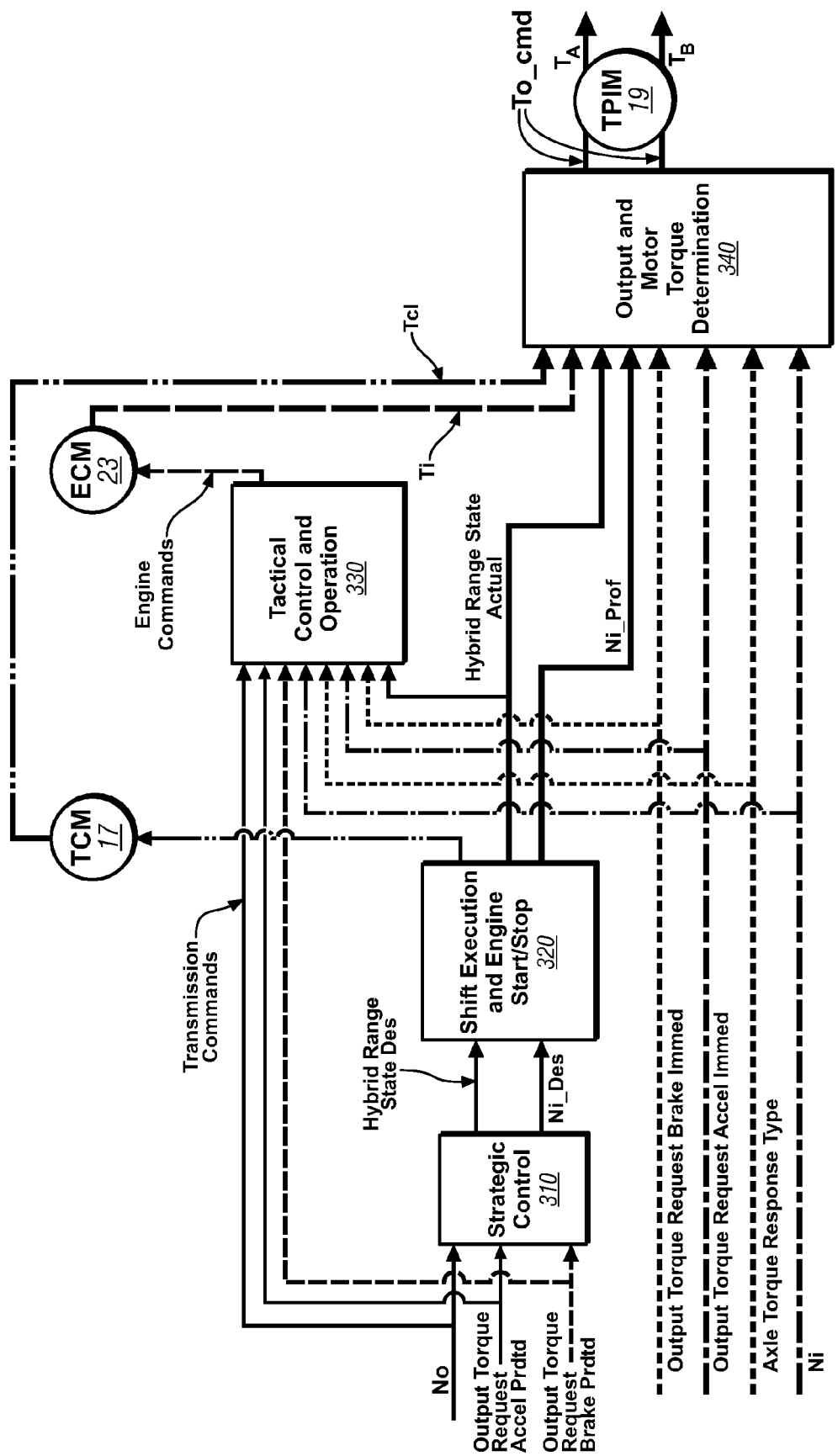
FIGS. 3, 4, 5, and 6 are schematic flow diagrams of a control system architecture for controlling and managing torque in a hybrid powertrain system, in accordance with the present disclosure.

FIG. 3 shows a control system architecture for controlling and managing signal flow in a hybrid powertrain system having multiple torque generative devices, described hereinbelow with reference to the hybrid powertrain system of FIGS. 1 and 2, and residing in the aforementioned control modules in the form of executable algorithms and calibrations. The control system architecture is applicable to alternative hybrid powertrain systems having multiple torque generative devices, including, e.g., a hybrid powertrain system having an engine and a single electric machine, a hybrid powertrain system having an engine and multiple electric machines. Alternatively, the hybrid powertrain system can utilize non-electric torque machines and energy storage systems, e.g., hydraulic-mechanical hybrid transmissions using hydraulically powered torque machines (not shown).

In operation, the operator inputs to the accelerator pedal 113 and the brake pedal 112 are monitored to determine the operator torque request. The operator inputs to the accelerator pedal 113 and the brake pedal 112 comprise individually determinable operator torque request inputs including an immediate accelerator output torque request ('Output Torque Request Accel Immed'), a predicted accelerator output torque request ('Output Torque Request Accel Prdtd'), an immediate brake output torque request ('Output Torque Request Brake Immed'), a predicted brake output torque request ('Output Torque Request Brake Prdtd') and an axle torque response type ('Axle Torque Response Type'). As used herein, the term 'accelerator' refers to an operator request for forward propulsion preferably resulting in increasing vehicle speed over the present vehicle speed, when the operator selected position of the transmission gear selector 114 commands operation of the vehicle in the forward direction. The terms 'deceleration' and 'brake' refer to an operator request preferably resulting in decreasing vehicle speed from the present vehicle speed. The immediate accelerator output torque request, the predicted accelerator output torque request, the immediate brake output torque request, the predicted brake output torque request, and the axle torque response type are individual inputs to the control system. Additionally, operation of the engine 14 and the transmission 10 are monitored to determine the input speed ('Ni') and the output speed ('No').

The immediate accelerator output torque request comprises an immediate torque request determined based upon the operator input to the accelerator pedal 113. The control system controls the output torque from the hybrid powertrain system in response to the immediate accelerator output torque request to cause positive acceleration of the vehicle. The immediate brake output torque request comprises an immediate braking request determined based upon the operator input to the brake pedal 112. The control system controls the output torque from the hybrid powertrain system in response to the immediate brake output torque request to cause deceleration, or negative acceleration, of the vehicle. Vehicle deceleration effected by control of the output torque from the hybrid powertrain system is combined with vehicle deceleration effected by a vehicle braking system (not shown) to decelerate the vehicle to achieve the immediate braking request.

The immediate accelerator output torque request is determined based upon a presently occurring operator input to the accelerator pedal 113, and comprises a request to generate an immediate output torque at the output member 64 preferably to accelerate the vehicle. The immediate accelerator output torque request is unshaped, but can be shaped by events that affect vehicle operation outside the powertrain control. Such events include vehicle level interruptions in the powertrain control for antilock braking, traction control and vehicle stability control, which can be used to unshape or rate-limit the immediate accelerator output torque request.

The predicted accelerator output torque request is determined based upon the operator input to the accelerator pedal 113 and comprises an optimum or preferred output torque at the output member 64. The predicted accelerator output torque request is preferably equal to the immediate accelerator output torque request during normal operating conditions, e.g., when any one of antilock braking, traction control, or vehicle stability is not being commanded. When any one of antilock braking, traction control or vehicle stability is being commanded the predicted accelerator output torque request remains the preferred output torque with the immediate accelerator output torque request being decreased in response to output torque commands related to the antilock braking, traction control, or vehicle stability control.

The immediate brake output torque request is determined based upon the operator input to the brake pedal 112 and the control signal to control the friction brakes to generate friction braking torque.

The predicted brake output torque request comprises an optimum or preferred brake output torque at the output member 64 in response to an operator input to the brake pedal 112 subject to a maximum brake output torque generated at the output member 64 allowable regardless of the operator input to the brake pedal 112. In one embodiment the maximum brake output torque generated at the output member 64 is limited to −0.2 g. The predicted brake output torque request can be phased out to zero when vehicle speed approaches zero regardless of the operator input to the brake pedal 112. As desired by a user, there can be operating conditions under which the predicted brake output torque request is set to zero, e.g., when the operator setting to the transmission gear selector 114 is set to a reverse gear, and when a transfer case (not shown) is set to a four-wheel drive low range. The operating conditions whereat the predicted brake output torque request is set to zero are those in which blended braking is not preferred due to vehicle operating factors.

The axle torque response type comprises an input state for shaping and rate-limiting the output torque response through the first and second electric machines 56 and 72. The input state for the axle torque response type can be an active state, preferably comprising one of a pleasability limited state a maximum range state, and an inactive state. When the commanded axle torque response type is the active state, the output torque command is the immediate output torque. Preferably the torque response for this response type is as fast as possible.

Blended brake torque includes a combination of the friction braking torque generated at the wheels 93 and the output torque generated at the output member 64 which reacts with the driveline 90 to decelerate the vehicle in response to the operator input to the brake pedal 112. The BrCM 22 commands the friction brakes on the wheels 93 to apply braking force and generates a command for the transmission 10 to create a negative output torque which reacts with the driveline 90 in response to the immediate braking request. Preferably the applied braking force and the negative output torque can decelerate and stop the vehicle so long as they are sufficient to overcome vehicle kinetic power at wheel(s) 93. The negative output torque reacts with the driveline 90, thus transferring torque to the electromechanical transmission 10 and the engine 14. The negative output torque reacted through the electromechanical transmission 10 can be transferred to the first and second electric machines 56 and 72 to generate electric power for storage in the ESD 74.

A strategic optimization control scheme ('Strategic Control') 310 determines a preferred input speed ('Ni_Des') and a preferred engine state and transmission operating range state ('Hybrid Range State Des') based upon the output speed and the operator torque request and based upon other operating parameters of the hybrid powertrain, including battery power limits and response limits of the engine 14, the transmission 10, and the first and second electric machines 56 and 72. The predicted accelerator output torque request and the predicted brake output torque request are input to the strategic optimization control scheme 310. The strategic optimization control scheme 310 is preferably executed by the HCP 5 during each 100 ms loop cycle and each 25 ms loop cycle. The desired operating range state for the transmission 10 and the desired input speed from the engine 14 to the transmission 10 are inputs to the shift execution and engine start/stop control scheme 320.

The shift execution and engine start/stop control scheme 320 commands changes in the transmission operation ('Transmission Commands') including changing the operating range state based upon the inputs and operation of the powertrain system. This includes commanding execution of a change in the transmission operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('Ni_Prof') can be determined. The input speed profile is an estimate of an upcoming input speed and preferably comprises a scalar parametric value that is a targeted input speed for the forthcoming loop cycle. The engine operating commands and the operator torque request are based upon the input speed profile during a transition in the operating range state of the transmission.

A tactical control scheme ('Tactical Control and Operation') 330 is repeatedly executed during one of the control loop cycles to determine engine commands ('Engine Commands') for operating the engine 14, including a preferred input torque from the engine 14 to the transmission 10 based upon the output speed, the input speed, and the operator torque request comprising the immediate accelerator output torque request, the predicted accelerator output torque request, the immediate brake output torque request, the predicted brake output torque request, the axle torque response type, and the present operating range state for the transmission. The engine commands also include engine states including one of an all-cylinder operating state and a cylinder deactivation operating state wherein a portion of the engine cylinders are deactivated and unfueled, and engine states including one of a fueled state and a fuel cutoff state. An engine command comprising the preferred input torque of the engine 14 and a present input torque ('Ti') reacting between the engine 14 and the input member 12 are preferably determined in the ECM 23. Clutch torques ('Tcl') for each of the clutches C1 70, C2 62, C3 73, and C4 75, including the presently applied clutches and the non-applied clutches are estimated, preferably in the TCM 17.

An output and motor torque determination scheme ('Output and Motor Torque Determination') 340 is executed to determine the preferred output torque from the powertrain ('To_cmd'). This includes determining motor torque commands ('$T_A$', '$T_B$') to transfer a net commanded output torque to the output member 64 of the transmission 10 that meets the operator torque request, by controlling the first and second electric machines 56 and 72 in this embodiment. The immediate accelerator output torque request, the immediate brake output torque request, the present input torque from the engine 14 and the estimated applied clutch torque(s), the present operating range state of the transmission 10, the input speed, the input speed profile, and the axle torque response type are inputs. The output and motor torque determination scheme 340 executes to determine the motor torque commands during each iteration of one of the loop cycles. The output and motor torque determination scheme 340 includes algorithmic code which is regularly executed during the 6.25 ms and 12.5 ms loop cycles to determine the preferred motor torque commands.

The hybrid powertrain is controlled to transfer the output torque to the output member 64 to the driveline 90 to generate tractive torque at wheel(s) 93 to forwardly propel the vehicle in response to the operator input to the accelerator pedal 113 when the operator selected position of the transmission gear selector 114 commands operation of the vehicle in the forward direction. Similarly, the hybrid powertrain is controlled to transfer the output torque to the output member 64 to the driveline 90 to generate tractive torque at wheel(s) 93 to propel the vehicle in a reverse direction in response to the operator input to the accelerator pedal 113 when the operator selected position of the transmission gear selector 114 commands operation of the vehicle in the reverse direction. Preferably, propelling the vehicle results in vehicle acceleration so long as the output torque is sufficient to overcome external loads on the vehicle, e.g., due to road grade, aerodynamic loads, and other loads.

Figure 4:
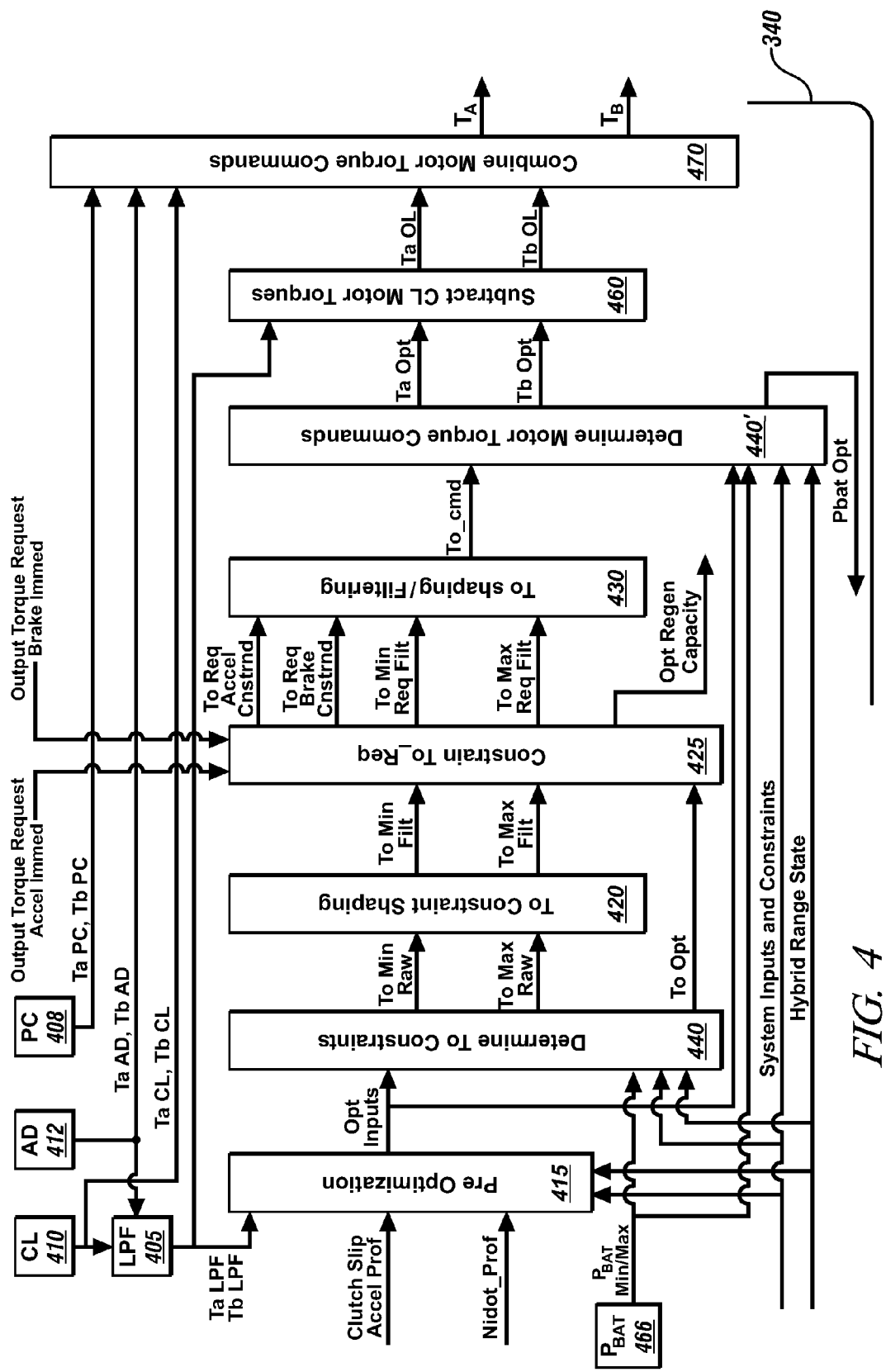

FIG. 4 details signal flow for the output and motor torque determination scheme 340 for controlling and managing the output torque through the first and second electric machines 56 and 72, described with reference to the hybrid powertrain system of FIGS. 1 and 2 and the control system architecture of FIG. 3. The output and motor torque determination scheme 340 controls the motor torque commands of the first and second electric machines 56 and 72 to transfer a net output torque to the output member 64 of the transmission 10 that reacts with the driveline 90 and meets the operator torque request, subject to constraints and shaping. The output and motor torque determination scheme 340 preferably includes algorithmic code and predetermined calibration code which is regularly executed during the 6.25 ms and 12.5 ms loop cycles to determine preferred motor torque commands ('$T_A$', '$T_B$') for controlling the first and second electric machines 56 and 72 in this embodiment.

The output and motor torque determination scheme 340 determines and uses a plurality of inputs to determine constraints on the output torque, from which it determines the output torque command ('To_cmd'). The motor torque commands ('$T_A$', '$T_B$') for the first and second electric machines 56 and 72 can be determined based upon the output torque command. The inputs to the output and motor torque determination scheme 340 include operator inputs, powertrain system inputs and constraints, and autonomic control inputs.

The operator inputs include the immediate accelerator output torque request ('Output Torque Request Accel Immed') and the immediate brake output torque request ('Output Torque Request Brake Immed').

The autonomic control inputs include torque offsets to effect active damping of the driveline 90 (412), to effect engine pulse cancellation (408), and to effect a closed loop correction based upon the input and clutch slip speeds (410). The torque offsets for the first and second electric machines 56 and 72 to effect active damping of the driveline 90 can be determined ('Ta AD', 'Tb AD'), e.g., to manage and effect driveline lash adjustment, and are output from an active damping algorithm ('AD') (412). The torque offsets to effect engine pulse cancellation ('Ta PC', 'Tb PC') are determined during starting and stopping of the engine during transitions between the engine-on state ('ON') and the engine-off state ('OFF') to cancel engine torque disturbances in unfired cylinders, and are output from a pulse cancellation algorithm ('PC') (408). The torque offsets for the first and second electric machines 56 and 72 to effect closed-loop correction torque are determined by monitoring input speed to the transmission 10 and clutch slip speeds of clutches C1 70, C2 62, C3 73, and C4 75. The closed-loop correction torque offsets for the first and second electric machines 56 and 72 ('Ta CL', 'Tb CL') can be determined based upon an input speed error, i.e., a difference between the input speed ('Ni'), e.g., as measured using sensor 11 or using the resolvers 80 and 82, and the input speed profile ('Ni Prof') and a clutch slip speed error, i.e., a difference between clutch slip speed and a targeted clutch slip speed, e.g., a clutch slip speed profile for a targeted clutch C1 70. When operating in one of the mode operating range states, the closed-loop correction motor torque offsets for the first and second electric machines 56 and 72 ('Ta CL', 'Tb CL') can be determined primarily based upon the input speed error. When operating in Neutral, the closed-loop correction is based upon the input speed error and the clutch slip speed error for a targeted clutch, e.g., C1 70. The closed-loop correction motor torque offsets are output from a closed loop control algorithm ('CL') (410). The clutch slip speeds of the non-applied clutches can be determined for the specific operating range state based upon motor speeds for the first and second electric machines 56 and 72 and the speed of the output member 64. The targeted clutch slip speed and clutch slip profile are preferably used during a transition in the operating range state of the transmission to synchronize clutch slip speed prior to applying an oncoming clutch, and operating the powertrain at an idle condition, in anticipation of a shift to a drive range. The closed-loop motor torque offsets and the motor torque offsets to effect active damping of the driveline 90 are input to a low pass filter to determine filtered motor torque corrections for the first and second electric machines 56 and 72 ('Ta LPF' and Tb LPF') (405).

A general governing equation for determining the closed-loop correction torque offsets for the first and second electric machines 56 and 72 ('Ta CL', 'Tb CL') for the exemplary transmission 10 is set forth in Eq. 1 below:

$$\begin{bmatrix} T_I CL \\ T_O CL \end{bmatrix} = [A_1] \begin{bmatrix} Ta & CL \\ Tb & CL \end{bmatrix} \quad [1]$$

wherein $A_1$ is a 2×2 matrix containing system-specific scalar values. A range of input torques, i.e., the minimum and maximum input torque constraints can be determined by executing the governing equation taking into account the net immediate output torque and the immediate accelerator output torque, the input and output member accelerations, and the clutch reactive torques. The powertrain system inputs and constraints include maximum and minimum available battery power limits ('$P_{BAT}$ Min/Max') output from a battery power limit algorithm ('$P_{BAT}$') (466), the operating range state ('Hybrid Range State'), and a plurality of system inputs and constraints ('System Inputs and Constraints'). The system inputs can include scalar parameters specific to the powertrain system and the operating range state, and can be related to speed and acceleration of the input member 12, output member 64, and the clutches. Other system inputs are related to system inertias, damping, and electric/mechanical power conversion efficiencies in this embodiment. The constraints include maximum and minimum motor torque outputs from the torque machines, i.e., first and second electric machines 56 and 72 and maximum and minimum clutch reactive torques for the applied clutches. Other system inputs include the input torque, clutch slip speeds and other relevant states.

Inputs including an input acceleration profile ('Nidot Prof') and a clutch slip acceleration profile ("Clutch Slip Accel Prof") are input to a pre-optimization algorithm (415), along with the system inputs, the operating range state, and the motor torque corrections for the first and second electric machines 56 and 72 ('Ta LPF' and Tb LPF'). The input acceleration profile is an estimate of an upcoming input acceleration that preferably comprises a targeted input acceleration for the forthcoming loop cycle. The clutch slip acceleration profile is an estimate of upcoming clutch acceleration for one or more of the non-applied clutches, and preferably comprises a targeted clutch slip acceleration for the forthcoming loop cycle. Optimization inputs ('Opt Inputs'), which can include values for motor torques, clutch torques and output torques can be calculated for the present operating range state and used in an optimization algorithm (440). The optimization algorithm (440) is preferably executed to determine the maximum and minimum raw output torque constraints (440) and to determine the preferred split of open-loop torque commands between the first and second electric machines 56 and 72 (440'). The optimization inputs, the maximum and minimum battery power limits, the system inputs and the present operating range state are analyzed to determine a preferred or optimum output torque ('To Opt') and minimum and maximum raw output torque constraints ('To Min Raw', 'To Max Raw') which can be shaped and filtered (420). The preferred output torque ('To Opt') comprises an output torque that minimizes battery power subject to a range of net output torques that are less than the immediate accelerator output torque request. The preferred output torque comprises the net output torque that is less than the immediate accelerator output torque request and yields the minimum battery power subject to the output torque constraints. The immediate accelerator output torque request and the immediate brake output torque request are each shaped and filtered and subjected to the minimum and maximum output torque constraints ('To Min Filt', 'To Max Filt') to determine minimum and maximum filtered output torque request constraints ('To Min Req Filt', 'To Max Req Filt'). A constrained accelerator output torque request ('To Req Accel Cnstrnd') and a constrained brake output torque request ('To Req Brake Cnstrnd') can be determined based upon the minimum and maximum filtered output torque request constraints (425). The constrained accelerator output torque request and the constrained brake output torque request comprise the immediate accelerator output torque request and the immediate brake output torque request limited within the maximum and minimum output torque constraints. Furthermore, a regenerative braking capacity ('Opt Regen Capacity') of the transmission 10 comprises a capacity of the transmission 10 to react driveline torque, and can be determined based upon constraints including maximum and minimum motor torque outputs from the torque machines and maximum and minimum reactive torques for the applied clutches, taking into account the battery power limits. The regenerative braking capacity establishes a maximum value for the immediate brake output torque request. The regenerative braking capacity is determined based upon a difference between the constrained accelerator output torque request and the preferred output torque ('To Opt'), shown with reference to FIG. 7. The constrained accelerator output torque request is shaped and filtered and combined with a constrained, shaped, and filtered brake output torque request to determine a net output torque command. The net output torque command is compared to the minimum and maximum request filtered output torques to determine the output torque command ('To_cmd') (430). When the net output torque command is between the maximum and minimum request filtered output torques, the output torque command is set to the net output torque command. When the net output torque command exceeds the maximum request filtered output torque, the output torque command is set to the maximum request filtered output torque. When the net output torque command is less than the minimum request filtered output torque, the output torque command is set to the minimum request filtered output torque command.

Powertrain operation is monitored and combined with the output torque command to determine a preferred split of open-loop torque commands between the first and second electric machines 56 and 72 that meets reactive clutch torque capacities ('Ta Opt' and 'Tb Opt'), and provide feedback related to the preferred battery power ('Pbat Opt') (440'). The output torque search range ('To Search Range') preferably comprises the output torque command ('To_cmd') when the optimization algorithm (440) is used to determine the preferred split of open-loop torque commands between the first and second electric machines 56 and 72 (440'). The motor torque corrections for the first and second electric machines 56 and 72 ('Ta LPF' and Tb LPF') are subtracted to determine open loop motor torque commands ('Ta OL' and 'Tb OL') (460).

The open loop motor torque commands are combined with the autonomic control inputs including the torque offsets to effect active damping of the driveline 90 (412), to effect engine pulse cancellation (408), and to effect a closed loop correction based upon the input and clutch slip speeds (410) and to determine the motor torques $T_A$ and $T_B$ for controlling the first and second electric machines 56 and 72 (470). The aforementioned steps of constraining, shaping and filtering the output torque request to determine the output torque command which is converted into the motor torque commands for the first and second electric machines 56 and 72 is preferably a feed-forward operation which acts upon the inputs and uses algorithmic code to calculate the torque commands.

The system operation as configured leads to determining output torque constraints based upon present operation and constraints of the powertrain system. The operator torque request is determined based upon operator inputs to the brake pedal and to the accelerator pedal. The operator torque request can be constrained, shaped and filtered to determine the output torque command, including determining a preferred regenerative braking capacity. An output torque command can be determined that is constrained based upon the constraints and the operator torque request. The output torque command is implemented by commanding operation of the torque machines. The system operation effects powertrain operation that is responsive to the operator torque request and within system constraints. The system operation results in an output torque shaped with reference to operator driveability demands, including smooth operation during regenerative braking operation.

Figure 5:
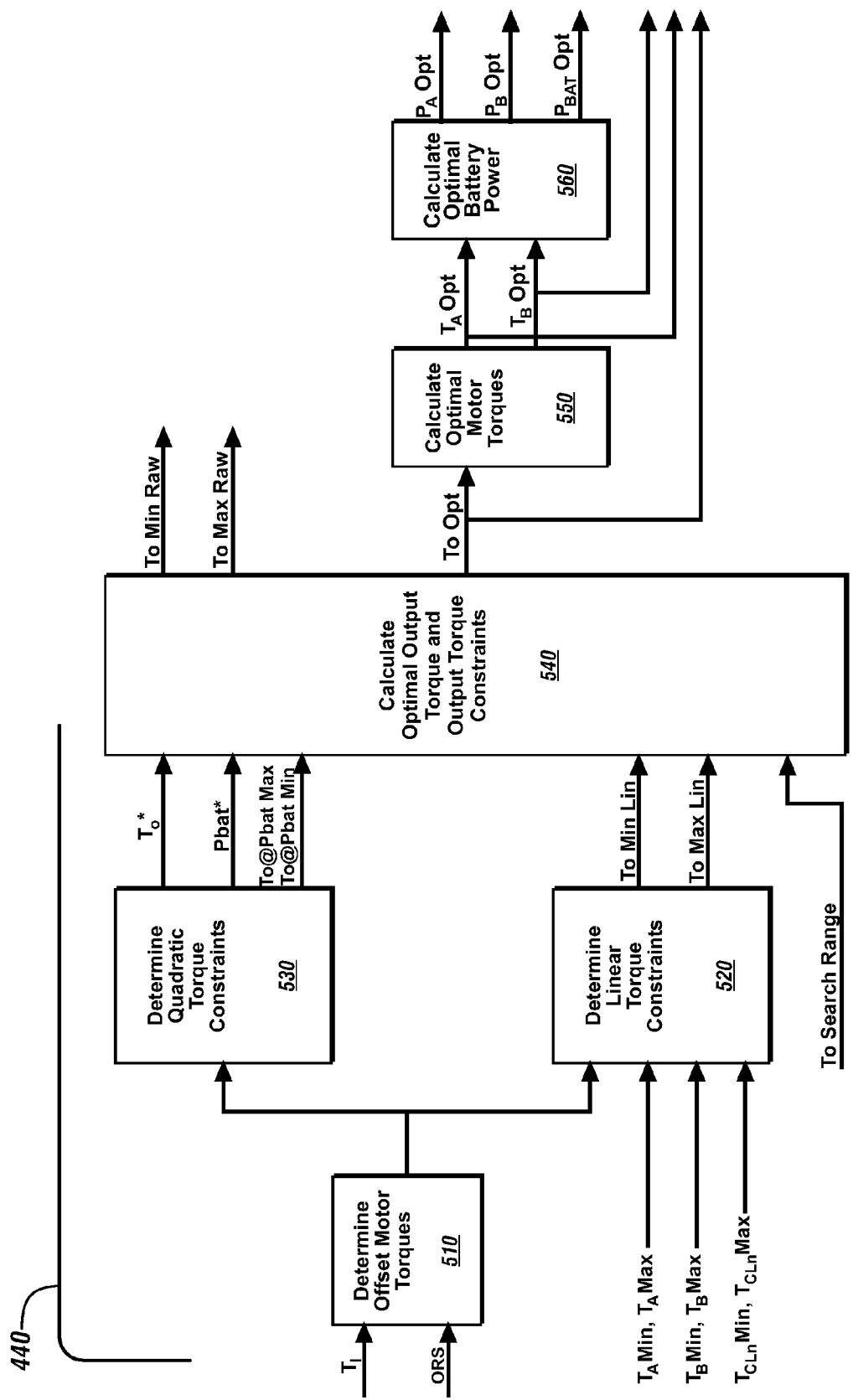

FIG. 5 schematically shows details of the optimization function 440 which includes monitoring present operating conditions of the electro-mechanical hybrid powertrain, e.g., the powertrain system described hereinabove. Offset motor torques for the first and second electric machines 56 and 72 can be calculated based upon inputs including the operating range state ('ORS') of the transmission 10, the input torque ('$T_I$') and other terms based upon system inertias, system damping, and clutch slippage (510).

The control system executes an algorithm to determine linear torque constraints to the output torque (520). The linear torque constraints comprise a plurality of system constraints that achieve a linear change in the output torque with a linear change in one of the constraints. The system constraints describe a capability of the hybrid transmission 10 to transfer and convert electric power to mechanical torque through the first and second electric machines 56 and 72. Inputs associated with the linear torque constraints include motor torque constraints comprising minimum and maximum achievable motor torques for the first and second electric machines 56 and 72 ('$T_A$Min', '$T_A$Max', '$T_B$Min', and '$T_B$Max'), and minimum and maximum clutch reactive torques for applied clutch(es) for first and where necessary, second applied clutches ('$T_{CLn}$Min', '$T_{CLn}$Max') and immediate or present torque, speed, and electric power inputs. Minimum and maximum linear output torques ('To Min Lin', 'To Max Lin') can be determined based upon the minimum and maximum achievable motor torques for the first and second electric machines 56 and 72 and the minimum and maximum clutch reactive torques for the applied clutch(es). The minimum and maximum linear output torques are the minimum and maximum output torques that meet the motor torque constraints and also meet the applied clutch torque constraints. The minimum and maximum linear output torques ('To Min Lin', 'To Max Lin') translate to the minimum and maximum raw output torques ('To Min Raw', 'To Max Raw').

The control system executes an algorithm to determine quadratic torque constraints to the output torque (530). The quadratic torque constraints comprise a plurality of system constraints that achieve a quadratic change in the output torque with a linear change in one of the constraints. Constraint inputs include the available battery power (not shown) for an exemplary system (530). The available battery power for the energy storage device 74 can be represented mathematically as a function of the transmission output torque To as shown in Eq. 2 below:

$$P_{BAT}(T_O) = (a_1^2 + b_1^2)(T_O - T_O^*)^2 + P_{BAT}^* \qquad [2]$$

wherein $a_1$ and $b_1$ represent scalar values determined for the specific application. Eq. 2 can be solved for the output torque, as shown in Eq. 3 below.

$$T_O(P_{BAT}) = T_O^* \pm \sqrt{\frac{P_{BAT} - P_{BAT}^*}{a_1^2 + b_1^2}} \qquad [3]$$

For the available battery power range $P_{BAT\_MIN}$ to $P_{BAT\_MAX}$, four distinct output torques can be determined from Eq. 3, including maximum and minimum quadratic output torque constraints for the positive root case and minimum and maximum quadratic output torque constraints for the negative root case ('To@$P_{BAT}$Max' and 'To@$P_{BAT}$Min'), and represent achievable ranges for the output torque based upon the battery power, depending on whether discharging, i.e., the positive root case, or charging, i.e., the negative root case.

The preferred output torque ('To Opt') can be determined based upon the optimized output torque ('To*'), the optimized battery power ('$P_{BAT}$*'), the maximum and minimum linear output torques, the minimum and maximum quadratic output torque constraints ('To@$P_{BAT}$ Max' and 'To@$P_{BAT}$ Min') selected based upon whether charging or discharging, and the output torque search range ('To Search Range'). The output torque search range ('To Search Range') preferably comprises the immediate accelerator output torque request ('To_req') when operating in a tractive torque generating state to forwardly propel the vehicle. The output torque search range ('To Search Range') preferably comprises a range between the immediate accelerator output torque request and a brake torque request when operating in a regenerative braking state to slow the vehicle. Determining the preferred output torque can include selecting a temporary output torque comprising a minimum torque value of the search range for the output torque and the maximum output torque. The preferred output torque ('To Opt') is selected as the maximum of the temporary output torque, the minimum output torque determined based upon one of the quadratic output torque constraints and clutch torque constraints, and the minimum linear output torque (540). The preferred output torque ('To Opt') is determined based upon inputs including the immediate accelerator output torque request. The preferred output torque ('To Opt') translates to the preferred output torque ('To(j)') output from the optimization function 440.

The preferred output torque ('To Opt') is subject to output torque constraints comprising the minimum and maximum unfiltered output torques ('To Min Raw', 'To Max Raw') and is determined based upon the range of allowable output torques, which can vary, and may comprise the immediate accelerator output torque request. The preferred output torque may comprise an output torque corresponding to a minimum battery discharge power or an output torque corresponding to a maximum battery charge power. The preferred output torque is based upon a capacity of the powertrain to transmit and convert electric power to mechanical torque through the first and second electric machines 56 and 72, and the immediate or present torque, speed, and reactive clutch torque constraints, and electric power inputs thereto. The output torque constraints including the minimum and maximum unfiltered output torques ('To Min Raw', 'To Max Raw') and the preferred output torque ('To Opt') can be determined by executing and solving an optimization function in one of the operating range states for neutral, mode and fixed gear operation. The optimization function 440 comprises a plurality of linear equations implemented in an executable algorithm and solved during ongoing operation of the system to determine the preferred output torque range to minimize battery power consumption and meet the operator torque request. Each of the linear equations takes into account the input torque ('Ti'), system inertias and linear damping. Preferably, there are linear equations specific to each of the operating range states for neutral, mode and fixed gear operations.

The output torque constraints comprise a preferred output torque range at the present input torque, within the available battery power and within the motor torque constraints subject to the reactive clutch torques of the applied torque transfer clutches. The output torque command is constrained within maximum and minimum output torque capacities. In fixed gear and mode operation, the preferred output torque can comprise the output torque which maximizes charging of the ESD 74. In neutral, the preferred output torque is calculated. In fixed gear operation, the preferred output torque can include the preferred torque split between the first and second electric machines 56 and 72 while meeting the reactive clutch torque constraints.

Preferred motor torques and battery powers ('$T_A$Opt', '$T_B$Opt', and '$P_{BAT}$Opt') can be determined based upon the preferred output torque, and used to control operation of the powertrain system. The preferred motor torques comprise motor torques which minimize power flow from the ESD 74 and achieve the preferred output torque. Torque outputs from the first and second electric machines 56 and 72 are controlled based upon the determined minimum power flow from the ESD 74, which is the preferred battery power ('$P_{BAT}$Opt'). Torque output is controlled based upon the engine input torque and the motor torque commands for the first and second electric machines 56 and 72, ('$T_A$Opt', '$T_B$Opt') respectively, which minimizes the power flow from the ESD 74 to meet the preferred output torque. The battery powers associated with the motors ('$P_A$Opt' and '$P_B$Opt', respectively) can be determined based upon the torque commands (560).

The motor torque commands can be used to control the first and second electric machines 56 and 72 to transfer output torque to the output member 64 and thence to the driveline 90 to generate tractive torque at wheel(s) 93 to propel the vehicle in response to the operator input to the accelerator pedal 113. Preferably, propelling the vehicle results in vehicle acceleration so long as the output torque is sufficient to overcome external loads on the vehicle, e.g., due to road grade, aerodynamic loads, and other loads.

Figure 6:
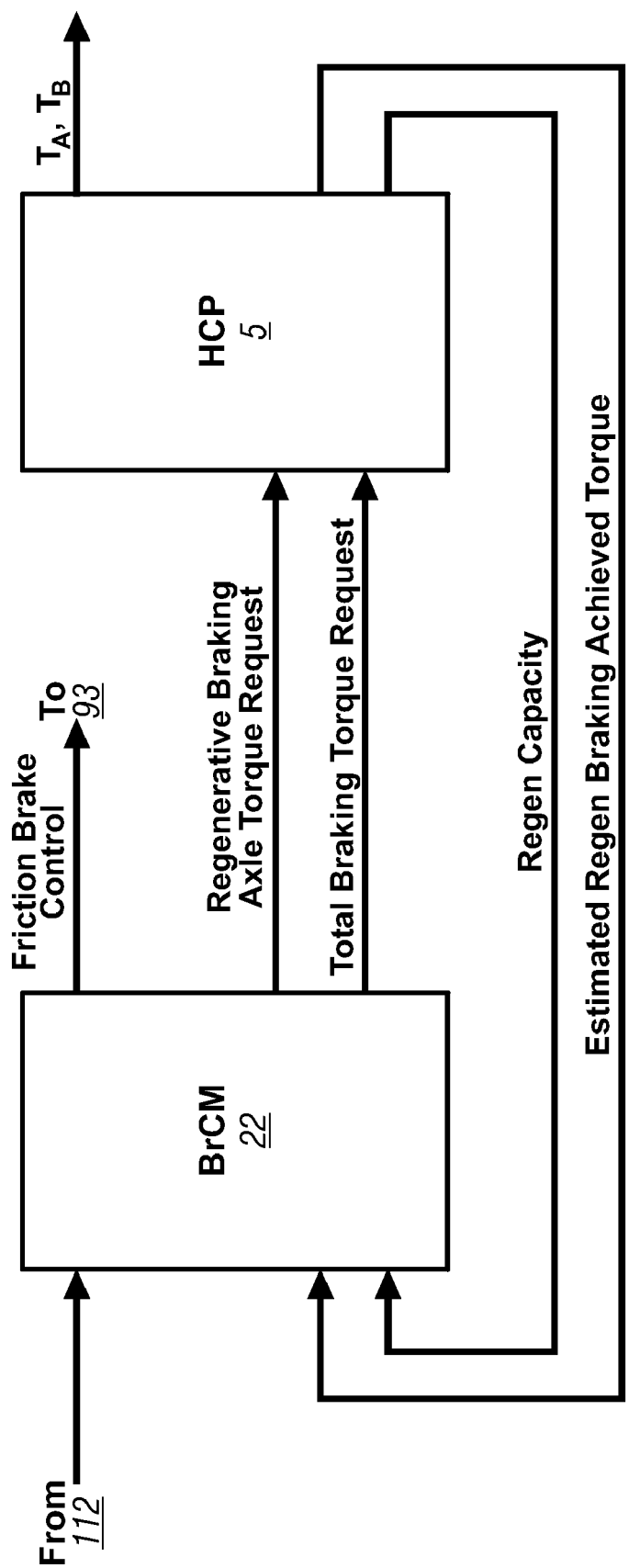

FIG. 6 shows a control system architecture for managing signal flow in the distributed control system to control output torque including tractive braking through one or more of the vehicle wheels 93, described with reference to the hybrid powertrain described hereinabove. The BrCM 22 monitors the operator braking request input to the brake pedal 112 ('Operator Braking Request'), and determines a total braking torque request ('Total Braking Torque Request'). The BrCM 22 generates a regenerative braking axle torque request ('Regenerative Braking Axle Torque Request') based upon the total braking torque request and a regenerative braking axle torque capacity ('Regen Capacity') and any presently applied regenerative braking torque ('Estimated Regen Braking Achieved Torque'). The regenerative braking axle torque request preferably comprises the immediate brake output torque request described hereinabove with reference to FIG. 3, scaled based upon axle ratio of the driveline 90 and filtered. The BrCM 22 generates a control signal ('Friction Brake Control') to control the actuable friction brake in each of the wheels 93 based upon a difference between the operator braking request and the regenerative braking torque that can be reacted through the transmission 10 by operation of the first and second electric machines 56 and 72 as estimated by the HCP 5. The BrCM 22 acts as a master arbitrator for controlling the friction brakes and the transmission 10 to meet the operator braking request.

The HCP 5 determines the regenerative braking axle torque capacity, which is a torque-based measurement of the ability of the transmission 10 to react torque from the driveline 90 through the selectively applied clutches C1 70, C2 62, C3 73, and C4 75 to the first and second electric machines 56 and 72, limited by the maximum brake output torque scaled based upon the axle ratio and filtered and rate-limited. The regenerative braking axle torque capacity preferably comprises the regenerative braking capacity ('Opt Regen Capacity') of the transmission 10 described herein with reference to FIG. 4. The HCP 5 estimates the presently applied regenerative braking torque reacted from the driveline 90 and the output member 64 of the transmission 10, and communicates the regenerative braking axle torque capacity and the regenerative braking torque to the BrCM 22. The HCP 5 determines the preferred output torque from the powertrain ('To_cmd') through the motor torque control scheme 340 and generates the motor torque commands ('$T_A$', '$T_B$') for controlling the first and second electric machines 56 and 72 based upon the regenerative braking axle torque request utilizing the control architecture described with reference to FIGS. 3 and 4.

The timing sequence of transmitting signals from the brake pedal 112 to the BrCM 22 and subsequently to the HCP 5 is intentional, as the most currently available operator input to the brake pedal can be used to control braking during a braking event. The HCP 5 leverages recuperation of kinetic energy through regenerative braking to generate storable electric power and improve operating efficiency.

The control system is described hereinabove with reference to an embodiment including the engine 14 and torque machines comprising the first and second electric machines 56 and 72 coupled to the electromechanical transmission 10. Alternatively, the control system can be used with other transmission systems having torque machines and energy storage systems which can controllably react torque through a driveline to effect tractive braking, preferably those that use the reactive torque through the driveline to generate storable power for subsequent use, e.g., in the form of stored electric power, stored hydraulic power, or stored mechanical power.

In operation, the operator torque request input to the accelerator pedal 113 is monitored, and a minimum available power output of the ESD 74 can be determined. A preferred output torque reacted through the output member 64 to the driveline 90 is determined based upon the minimum available power output of the energy storage device. The regenerative braking torque capacity, comprising a torque range between the preferred output torque reacted through the output member to the driveline and the operator torque request input to the accelerator pedal, can be determined. Preferably the immediate accelerator output torque request is determined based upon the operator input to the accelerator pedal. Operator input to a brake pedal can also be monitored, and an immediate brake output torque request is determined based upon the operator input to the brake pedal during the operator brake request, thus commanding operation of the powertrain system based upon the operator torque request including the operator brake.

The operation of the transmission 10 can include commanding a shift from one of the fixed gears, e.g., G1, G2, G3, and G4. The shift operation preferably includes initially transitioning to operating in one of the continuously variable operating range states, e.g., M1 and M2. The operation of the powertrain is controlled during operation in the continuously variable operating range state, including controlling reacted output torque from the transmission 10 based upon the regenerative braking torque capacity.

Therefore, operation of the engine 14 can be managed through the tactical operation 330, and the output and motor determination scheme 340 can manage motor torques of the first and second electric machines 56 and 72. This operation includes determining the preferred output torque reacted through the output member 64 to the driveline 90 based upon the minimum available power output of the energy storage device and clutch reactive torque for the selectively applied torque transfer clutches. This operation can be important when the torque constraints are such that the optimized output torque ('To*') and the optimized battery power ('$P_{BAT}$*') determined with reference to Eqs. 1 and 2, above, fall within the minimum and maximum linear output torques ('To Min Lin', 'To Max Lin'). In this situation, the preferred output torque and the preferred battery power are the optimized output torque ('To*'), the optimized battery power ('$P_{BAT}$*'). Otherwise, the achievable ranges for the output torque are based upon based upon the available battery power, depending on whether discharging, i.e., the positive root case, or charging, i.e., the negative root case, and the linear torque constraints.

Figure 7:
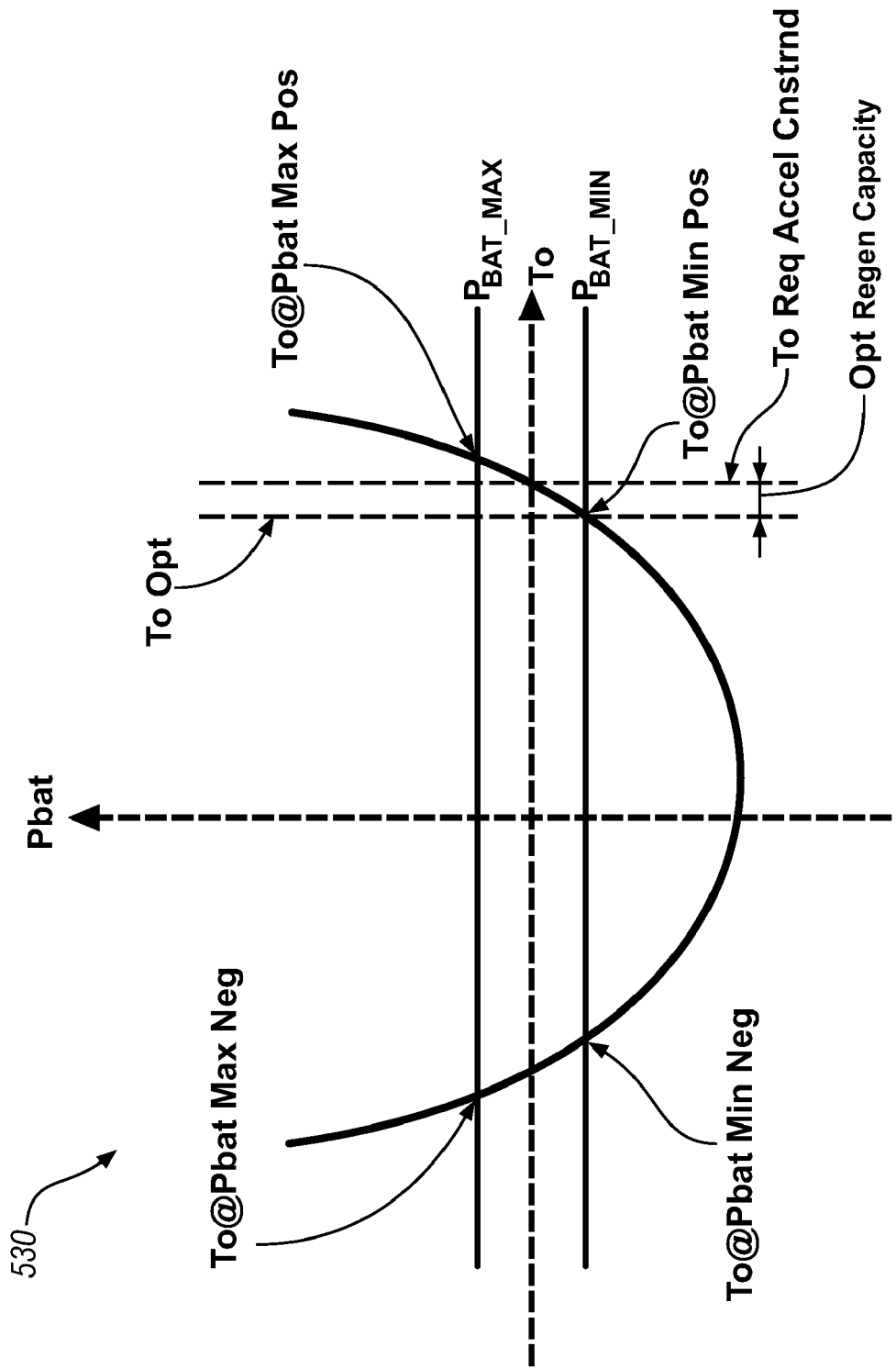
FIG. 7 is a datagraph, in accordance with the present disclosure.

FIG. 7 depicts battery power ('$P_{BAT}$') plotted as a function of output torque ('To') for the exemplary powertrain system. The minimum and maximum available battery power ('$P_{BAT\_MIN}$' and '$P_{BAT\_MAX}$') are shown. The preferred output torque ('To Opt'), described hereinabove with reference to FIGS. 4 and 5 comprises the output torque that is less than the immediate accelerator output torque request and yields the minimum battery power subject to and limited by the output torque constraints. The minimum available battery power comprises a maximum charging battery power for the ESD 74 in one embodiment. Thus, as depicted, the preferred output torque is based upon a capacity of the powertrain to transmit tractive torque input from the driveline 90 to the transmission 10, transfer the tractive torque via one or more of the torque transfer clutches to spin one of the first and second electric machines 56 and 72 which can be controlled to react the tractive torque and transform it to electric power that is storable in the ESD 74. The preferred output torque is limited by the immediate or present torque, speed, and reactive clutch torque constraints, and electric power inputs thereto, described with reference to FIGS. 4 and 5. The operator torque requests, including the immediate accelerator output torque request constrained ('To Req Accel Cnstrnd') can be similarly plotted. The preferred regenerative braking capacity ('Opt Regen Capacity') i.e., the present torque capacity of the transmission 10 to react tractive torque comprises an output torque range between the preferred output torque and the immediate accelerator output torque request. The preferred regenerative braking capacity ('Opt Regen Capacity') is a permissible output torque operating range. Thus, the output torque is constrained within the preferred regenerative braking capacity, and the output and motor determination scheme 340 controls operation of the first and second electric machines 56 and 72 to achieve the output torque, including during shifts in the operating range state.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for operating a hybrid powertrain system including a transmission operative to transfer power between an input member and a torque machine and an output member coupled to a driveline coupled to a wheel including an actuable friction brake, the torque machine operative to react torque transferred from the wheel through the driveline to the output member of the transmission, the torque machine connected to an energy storage device, the method comprising:
monitoring an operator torque request input to an accelerator pedal;
determining a minimum available power output of the energy storage device;
determining a preferred output torque reacted through the output member to the driveline based upon the minimum available power output of the energy storage device;
determining a regenerative braking torque capacity comprising a torque range between the preferred output torque reacted through the output member to the driveline and the operator torque request input to the accelerator pedal; and
controlling operation of the hybrid powertrain based upon the regenerative braking torque capacity.

2. The method of claim 1, further comprising:
determining an immediate accelerator output torque request based upon the operator input to the accelerator pedal; and
determining the regenerative braking torque capacity based upon the preferred output torque reacted through the output member to the driveline and the immediate accelerator output torque request.

3. The method of claim 2, wherein the minimum power output from the energy storage device comprises a maximum charging power for charging the energy storage device at a powertrain system operating point.

4. The method of claim 1, further comprising determining the preferred output torque reacted through the output member to the driveline based upon the minimum available power output of the energy storage device and torque constraints on the hybrid transmission.

5. The method of claim 4, wherein the minimum available power output of the energy storage device comprises a maximum charging power.

6. The method of claim 1, further comprising
monitoring operator input to a brake pedal and determining an immediate brake output torque request based upon the operator input to the brake pedal during an operator brake request; and
controlling torque output of the power generating device based upon the immediate brake output torque request and the preferred regenerative braking capacity.

7. The method of claim 1, further comprising selectively applying torque transfer clutches of the transmission to transfer power between the torque machine and the output member in one of fixed gear and continuously variable operating range states.

8. The method of claim 7, further comprising:
commanding a shift from the fixed gear operating range state including operating in the continuously variable operating range state; and
controlling output torque from the transmission in the continuously variable operating range state based upon the regenerative braking torque capacity.

9. The method of claim 7, further comprising determining the preferred output torque reacted through the output member to the driveline based upon the minimum available power output of the energy storage device and a clutch reactive torque for the selectively applied torque transfer clutch.

10. Method for operating a hybrid powertrain system including a transmission operative to transfer power between an input member and a plurality of torque machines and an output member coupled to a driveline coupled to a wheel including an actuable friction brake, one of the torque machines operative to react torque transferred from the wheel through the driveline to the output member of the transmission, the torque machines are connected to an energy storage device; the method comprising:
monitoring an operator torque request input to an accelerator pedal;
determining a minimum available power output of the energy storage device;
determining a preferred output torque reacted through the output member to the driveline based upon the minimum available power output of the energy storage device;
determining a regenerative braking torque capacity comprising a torque range between the preferred output torque reacted through the output member to the driveline and the operator torque request input to the accelerator pedal, and
controlling operation of the hybrid powertrain based upon the regenerative braking torque capacity.

11. The method of claim 10, further comprising selectively applying torque transfer clutches of the transmission to transfer power between the torque machines and the output member in one of fixed gear and continuously variable operating range states.

12. The method of claim 11, further comprising:
commanding a shift from one of the fixed gear operating range states including operating in the continuously variable operating range state; and controlling output torque from the transmission in the continuously variable operating range state based upon the regenerative braking torque capacity.

13. The method of claim 12, further comprising:
commanding a shift from the fixed gear operating range state including operating in the continuously variable operating range state; and
controlling output torque from the transmission in the continuously variable operating range state based upon the regenerative braking torque capacity.

14. The method of claim 13, further comprising determining the preferred output torque reacted through the output member to the driveline based upon the minimum available power output of the energy storage device and clutch reactive torque for the selectively applied torque transfer clutch.

15. The method of claim 14, comprising determining motor torque commands for controlling the torque machines based upon the preferred output torque reacted through the output member to the driveline.

16. Method for operating a hybrid powertrain system including a transmission operative to transfer power between an input member and a plurality of torque machines and an output member coupled to a driveline coupled to a wheel, the transmission operative to transfer power between the input member and the torque machines and the output member in one of a fixed gear and a continuously variable operating range state through selective actuation of torque transfer clutches, the torque machines are connected to an energy storage device, and one of the torque machines operative to react torque transferred from the wheel through the driveline to the output member of the transmission, the method comprising:

monitoring an operator torque request input to an accelerator pedal;
determining a minimum available power output of the energy storage device;
determining a preferred output torque reacted through the output member to the driveline based upon the minimum available power output of the energy storage device;
determining a regenerative braking torque capacity comprising a torque range between the preferred output torque reacted through the output member to the driveline and the operator torque request input to the accelerator pedal; and
controlling operation of the hybrid powertrain based upon the regenerative braking torque capacity.

17. The method of claim 16, further comprising:
commanding a shift from one of the fixed gears including operating in the continuously variable operating range state; and
controlling output torque from the transmission in the continuously variable operating range state based upon the regenerative braking torque capacity.

18. The method of claim 17, further comprising determining the preferred output torque reacted through the output member to the driveline based upon the minimum available power output of the energy storage device and clutch reactive torque for the selectively applied torque transfer clutch.

19. The method of claim 18, comprising determining motor torque commands for controlling the torque machines based upon the preferred output torque reacted through the output member to the driveline.

* * * * *